Oct. 31, 1939.                S. ENSTROM                2,178,166
                        CAKE HOLDER AND SUPPORT
                          Filed May 9, 1938
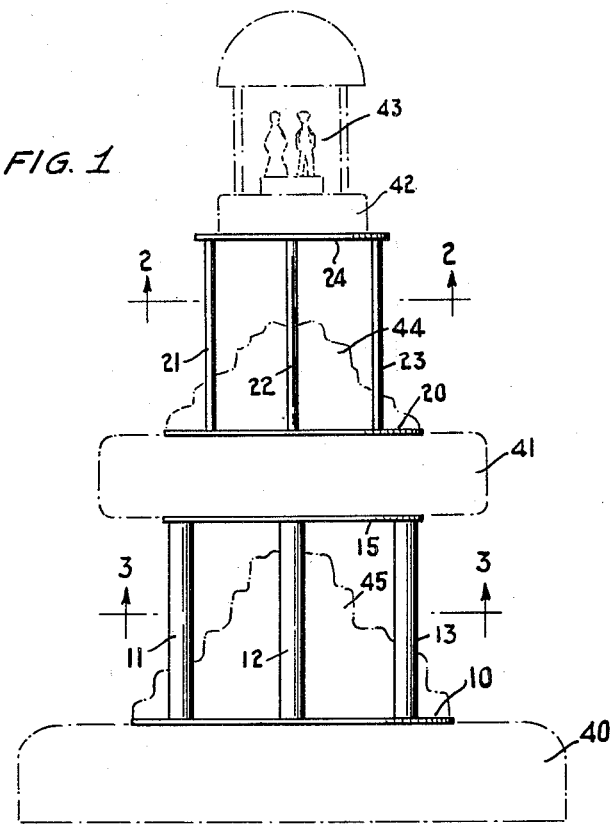
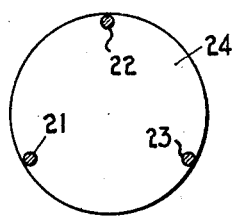
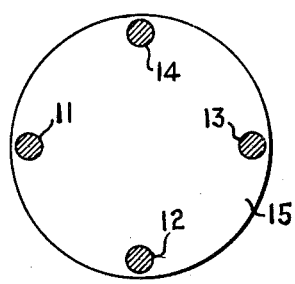
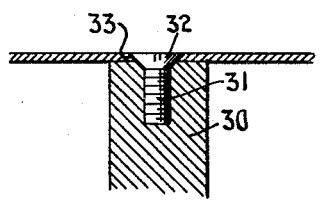
SIXTUS ENSTROM
INVENTOR
BY *Victor J. Evans & Co.*
ATTORNEYS Patented Oct. 31, 1939

2,178,166

UNITED STATES PATENT OFFICE 2,178,166

CAKE HOLDER AND SUPPORT

Sixtus Enstrom, New York, N. Y.

Application May 9, 1938, Serial No. 206,915

2 Claims. (Cl. 248—163)

This invention relates to new and improved cake stands and more especially to a novel cake support or stand for use with birthday cakes, wedding cakes and the like.

It is often desirable to prepare wedding cakes comprising a plurality of strata held in spaced relationship with ornamental or decorative material filling at least a portion of the spaces therebetween. A type of decoration which has found especial favor is that wherein a portion of the cake is supported by a plurality of pillars whereby a second cake or the like can be held above the first cake, the spaces in between being used for purposes of decoration and ornamentation. This type of structure, however, has ordinarily precluded the use of ordinary cake material for the lowermost layer inasmuch as the pillars supporting the upper layer at least tended, upon standing, to pass through or at least into the lowermost layer resulting in sagging.

It is among the objects of the present invention to provide novel separator members for use in wedding and birthday cakes or the like whereby a first layer of cake can support in spaced parallelism a second layer of cake without appreciable sagging or disturbance of the parallelism existing between the layers upon standing.

It is also an object of the present invention to provide novel separator members for foodstuffs which are ornamental and adapted to facilitate serving of the foodstuffs and also to form an ornamental combination therefor.

One of the important advantages of the novel device according to the present invention is that it includes means adapted to rest upon a surface, such as a cake, which is normally not hard without pressing into same whereby material can be supported on the separator device without sagging.

One of the features of the novel separator device according to the present invention is that it can be easily dismantled for purposes of cleaning prior or subsequent to use.

Another feature is that the novel device comprises relatively few parts, all of which can be easily and economically formed of relatively inexpensive material and which can be assembled with comparative ease to form the device without ncessitating employment of skilled labor.

Other objects, advantages and features of the novel foodstuff holder and separator according to the present invention will be apparent to those skilled in the art during the course of the following description.

Regarded in certain of its broader aspects, the new and improved cake holder and separator according to the present invention comprises a base plate having fixedly attached thereto and upwardly extending therefrom a plurality of spaced essentially parallel pillar-like members mutually coextensive and carrying on their upper ends a second plate preferably lesser in diameter than the base plate, said second plate being rigidly secured to the end parts of said members.

In order to facilitate a fuller and more complete understanding of the novel cake holder and separator according to the present invention a specific embodiment thereof, herein illustrated, will be hereinafter described, it being clearly understood however that the illustrated embodiment of the invention is given solely by way of example and is essentially non-limitative upon the invention except as expressed in the subjoined claims attached to and forming a part of this specification.

Referring, then, to the drawing—

Fig. 1 is substantially a side elevational view showing the novel cake holders and separators according to the present invention in use, the cake proper being shown in phantom;

Fig. 2 is a horizontal sectional view of Fig. 1 taken along the line 2—2;

Fig. 3 is a horizontal sectional view of Fig. 1 taken along the line 3—3; and

Fig. 4 is a fragmentary detailed sectional view showing the preferred method of attaching the pillar-like members to the plates.

In the illustrated embodiment the numeral 10 designates a base plate preferably substantially circular in outline and essentially flat. A plurality of pillar-like members 11, 12, 13 and 14 are attached at end parts thereof to said plate, said pillar-like members in the illustrated embodiment being four in number and arranged near the edge of the plate in positions equidistant from the center of the plate and equally spaced from the adjoining members. It will be noted that the members 11, 12, 13 and 14 extend upwardly from the plate in substantial parallelism with each other and are mutually coextensive. A second plate 15 is rigidly secured to the upper ends of the members 11, 12, 13 and 14 and is substantially circular in outline and essentially flat, said plate being preferably positioned with its center point directly above the center point of the base plate 10 hereinbefore referred to whereby the ends of the members 11, 12, 13 and 14 are arranged on the end surface of the plate 15 in positions equidistant from the center of the plate and equidistant from adjoining members. It will be noted that the plates 10 and 15 are held in spaced substantial parallelism by upright members 11, 12, 13 and 14 when assembled as hereinbefore described.

A second type of holder and spacer device comprises a base plate 20 preferably essentially circular in outline and flat having attached thereto upright pillar-like members 21, 22 and 23, said pillar-like members being spaced equidistantly from the center of the plate 20 and positioned equidistantly with respect to each other whereby the members extend upwardly in substantial parallelism from the plate as shown. The members 21, 22 and 23 are of substantially the same length and have attached thereto an upright plate 24 firmly secured thereto, said plate 24 being preferably essentially circular in outline and positioned on the ends of the members 21, 22 and 23 whereby the places of contact of said members in said plates are equidistant from the center point of the plate and are each spaced equidistantly from the places of contact on the other members.

Referring especially to Fig. 4, wherein the presently preferred method of attaching plates to the pillar members is illustrated in fragmentary sectional detail, it will be noted that the end portion 30 of one of the pillars is provided with a tapped, partially chamfered opening adapted to receive and engage with a threaded screw-like member 31 provided with a beveled flat head 32 substantially as shown, said head being engageable with a chamfered opening formed in a portion 33 of one of the plates whereby passing the screw through the opening in the plate and engaging same with the opening in the end portion of the pillar substantially fixedly holds the plate against the pillar end substantially as shown. It will, of course, be understood that other methods of attaching the plates to the pillars can be employed if desired.

In use, the cake which is to form the lowermost layer, designated by the numeral 40, is positioned on a suitable support and the plate 10 comprising the base plate of one of the separator members is positioned upon the upper surface of the cake preferably with the center of the base plate located near the center of the cake. A second cake 41 is then positioned upon the upper surface of the plate 15 preferably being centered thereon and the base plate 20 is then positioned upon the upper surface of the cake 41 likewise being centered. The third layer 42, including ornamental material generally designated by the numeral 43, is positioned and centered upon the upper surface of the plate 24. If desirable, decorative material generally designated by the numerals 44 and 45 can be provided upon the upper surfaces of the plates 20 and 10, respectively, to further enhance the appearance of the cake. It is also to be understood that, if desired, icing or the like can be applied around the edges of and over the plates, thereby further augmenting the ornamental effect thereof.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A cake holder and supporter of the type described comprising a first plate, flat and substantially circular in outline, a plurality of mutually coextensive upright pillar-like members substantially firmly but disengageably attached to said base plate, said members being arranged substantially equidistantly from the center point of said plate and each equidistantly spaced from adjoining members, said members extending upwardly from said plate in substantial parallelism, a second plate mounted on the free ends of said upright members and substantially firmly but disengageably attached thereto, said second plate being flat and substantially circular in outline.

2. A cake holder of the type described comprising a base plate, substantially flat and circular in outline, having a plurality of chamfered openings formed therein spaced equidistantly from the center point of said plate and equidistantly from each other, a plurality of pillar-like members each end of each of said members having a tapped, partially chamfered opening formed therein, means for substantially rigidly but disengageably securing said pillar-like members to said plate, comprising a plurality of flat headed beveled edge screws receivable within and engageable with said chamfered openings in said plate and receivable within and engageable with said tapped openings in said pillar-like members whereby said pillar-like members can be mounted on said plate extending upwardly therefrom in spaced substantial parallelism, a second plate, flat and substantially circular in outline, having a plurality of equally radially spaced chamfered openings formed therein located equidistantly from the center point of said plate, and flat headed beveled edge screw members receivable within said openings in said plate and receivable within and engageable with the threaded openings in the free ends of said pillar-like members whereby said plates can be firmly but disengageably held in spaced parallelism with respect to each other by said pillar-like members.

SIXTUS ENSTROM.